United States Patent
Lee et al.

(10) Patent No.: US 8,929,244 B2
(45) Date of Patent: Jan. 6, 2015

(54) METHOD AND DEVICE FOR SEND BEAMFORMING AND MULTIPLE USER SCHEDULING FOR MULTIPLE SECTOR COOPERATIVE TRANSMISSION IN A MULTIPLE ANTENNA SYSTEM

(75) Inventors: Yong-Hwan Lee, Seoul (KR); Seung-Hwan Lee, Suwon-si (KR); Hyung-Sin Kim, Seoul (KR)

(73) Assignees: Samsung Electronics Co., Ltd., Suwon-Si (KR); SNU R&DB Foundation, Seoul (KR)

( * ) Notice: Subject to any disclaimer, the term of this patent is extended or adjusted under 35 U.S.C. 154(b) by 158 days.

(21) Appl. No.: 13/813,138

(22) PCT Filed: Jul. 29, 2011

(86) PCT No.: PCT/KR2011/005629
§ 371 (c)(1),
(2), (4) Date: Jan. 29, 2013

(87) PCT Pub. No.: WO2012/015279
PCT Pub. Date: Feb. 2, 2012

(65) Prior Publication Data
US 2013/0128764 A1    May 23, 2013

(30) Foreign Application Priority Data

Jul. 29, 2010 (KR) .................. 10-2010-0073236

(51) Int. Cl.
G01R 31/08 (2006.01)
H04B 7/04 (2006.01)
H04B 7/06 (2006.01)

(52) U.S. Cl.
CPC ............ *H04B 7/0695* (2013.01); *H04B 7/0452* (2013.01); *H04B 7/0491* (2013.01); *H04B 7/0617* (2013.01)
USPC .......... 370/252; 370/328; 370/334; 370/338; 370/329

(58) Field of Classification Search
None
See application file for complete search history.

(56) References Cited

U.S. PATENT DOCUMENTS

| | | | |
|---|---|---|---|
| 7,400,606 B2* | 7/2008 | Padovani et al. | 370/335 |
| 7,555,301 B2* | 6/2009 | Skafidas et al. | 455/450 |
| 7,760,685 B2* | 7/2010 | Avidor et al. | 370/328 |
| 2009/0310586 A1 | 12/2009 | Shatti | |
| 2010/0027456 A1 | 2/2010 | Onggosanusi et al. | |
| 2010/0039951 A1 | 2/2010 | She et al. | |
| 2010/0075705 A1 | 3/2010 | van Rensburg et al. | |
| 2010/0165845 A1 | 7/2010 | Lott et al. | |
| 2010/0177726 A1 | 7/2010 | Olszewski | |
| 2011/0026418 A1* | 2/2011 | Bollea et al. | 370/252 |
| 2012/0142400 A1* | 6/2012 | Lo et al. | 455/562.1 |

OTHER PUBLICATIONS

International Search Report dated Feb. 15, 2012 in connection with International Patent Application No. PCT/KR2011/005629.
Written Opinion dated Feb. 15, 2012 in connection with International Patent Application No. PCT/KR2011/005629.

* cited by examiner

*Primary Examiner* — Duc C Ho (57) ABSTRACT

A Tx beamforming method for multi-sector cooperative transmission in a multi-antenna system includes determining a transmission mode of sector boundary users according to a channel condition; determining a multi-sector cooperative Tx beam for supporting multiple users, based on the transmission mode of the user; determining a user combination for multi-sector cooperative beamforming by considering the determined multi-sector cooperative Tx beam; and performing sector cooperative Tx beamforming with the determined user combination. Thus, the overall system capacity can be enhanced.

20 Claims, 7 Drawing Sheets

METHOD AND DEVICE FOR SEND BEAMFORMING AND MULTIPLE USER SCHEDULING FOR MULTIPLE SECTOR COOPERATIVE TRANSMISSION IN A MULTIPLE ANTENNA SYSTEM

CROSS-REFERENCE TO RELATED APPLICATION

The present application claims priority under 35 U.S.C. §365 to International Patent Application No. PCT/KR2011/005629 filed Jul. 29, 2011, entitled "METHOD AND DEVICE FOR SEND BEAMFORMING AND MULTIPLE USER SCHEDULING FOR MULTIPLE SECTOR COOPERATIVE TRANSMISSION IN A MULTIPLE ANTENNA SYSTEM". International Patent Application No. PCT/KR2011/005629 claims priority under 35 U.S.C. §365 and/or 35 U.S.C. §119(a) to Korean Patent Application No. 10-2010-0073236 filed Jul. 29, 2010, and which are incorporated herein by reference into the present disclosure as if fully set forth herein.

TECHNICAL FIELD OF THE INVENTION

The present invention relates generally to a multi-antenna system. More particularly, the present invention relates to a method and an apparatus for Tx beamforming and multi-user scheduling for multi-sector cooperative transmission in a wireless communication system using multiple antennas.

BACKGROUND OF THE INVENTION

Since a downlink system performance of a sector boundary is seriously degraded by adjacent sector interference in a multi-sector wireless communication system, it is strictly necessary to cancel the adjacent sector interference. A base station can attain a performance gain by cancelling the adjacent sector interference through multi-sector cooperative coherent beamforming or multi-sector cooperative eigen beamforming, based on instantaneous or statistic channel information of a sector boundary user. However, since a single beamforming scheme such as multi-sector cooperative coherent beamforming or multi-sector cooperative eigen beamforming services only single user within multiple sectors in cooperation with two sectors, the number of users supportable per sector is halved and thus the overall system performance is degraded.

Hence, a multi-user multi-sector cooperative beamforming scheme such as Zero-Forcing (ZF) or Minimum Mean Square Error (MMSE) for simultaneously supporting multiple users in the sector is recently under consideration. The ZF scheme or the MMSE scheme reduces the sector interference and obtains a spatial multiplexing gain through the multi-sector cooperative transmission, and thus can address the shortcoming of the conventional multi-sector cooperative coherent beamforming or eigen beamforming. However, since the ZF or MMSE based sector cooperative beamforming scheme is solely based on the instantaneous channel information, it is quite vulnerable to a channel mismatch problem caused by a user's speed and a sounding error. Accordingly, when this scheme is uniformly applied to the sector boundary users having different channel conditions such as user's speed, not only the high-speed users cannot attain a beamforming gain but also the multi-user spatial multiplexing gain is reduced by multi-beam residual interference which increases in proportion to a transmission delay or a channel estimation error. Thus, when scheduling for the multi-user multi-sector cooperative transmission is performed without considering the performance degradation caused by the channel mismatch problem, it is impossible to select an optimal number of users and an optimal user combination for maximizing the system capacity. As a result, the multi-sector cooperative transmission performance is considerably degraded.

Hence, multi-sector cooperative transmission method and apparatus are required to reduce the system performance degradation caused by the channel mismatch problem of the user's speed and the sound error in the multi-antenna system. Also, scheduling method and apparatus for the multi-user multi-sector cooperative transmission are demanded to maximize the system capacity in the multi-antenna system.

SUMMARY OF THE INVENTION

To address the above-discussed deficiencies of the prior art, it is a primary aspect of the present invention to provide Tx beamforming and multi-user scheduling method and apparatus for multi-sector cooperative transmission in a multi-antenna system.

Another aspect of the present invention is to provide multi-sector cooperative transmission method and apparatus for reducing system performance degradation caused by a channel mismatch problem due to a user's speed and a sounding error in a multi-antenna system.

Yet another aspect of the present invention is to provide scheduling method and apparatus for multi-user multi-sector cooperative transmission to maximize a system capacity in a multi-antenna system.

According to one aspect of the present invention, a Tx beamforming method for multi-sector cooperative transmission in a multi-antenna system includes determining a transmission mode of sector boundary users according to a channel condition; determining a multi-sector cooperative Tx beam for supporting multiple users, based on the transmission mode of the user; determining a user combination for multi-sector cooperative beamforming by considering the determined multi-sector cooperative Tx beam; and performing sector cooperative Tx beamforming with the determined user combination.

According to another aspect of the present invention, a Tx beamforming apparatus for multi-sector cooperative transmission in a multi-antenna system includes a transmission mode determiner for determining a transmission mode of sector boundary users according to a channel condition; a weight determiner for determining a multi-sector cooperative Tx beam for supporting multiple users, based on the transmission mode of the user; a user combination determiner for determining a user combination for multi-sector cooperative beamforming by considering the determined multi-sector cooperative Tx beam; and a Radio Frequency (RF) pre-processor for performing sector cooperative Tx beamforming with the determined user combination.

Other aspects, advantages, and salient features of the invention will become apparent to those skilled in the art from the following detailed description, which, taken in conjunction with the annexed drawings, discloses exemplary embodiments of the invention.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Exemplary embodiments of the present invention provide Tx beamforming and multi-user scheduling method and apparatus for multi-sector cooperative transmission in a multi-antenna system.

Particularly, the present invention provides a method for classifying Instantaneous channel Sector Cooperation (ISC) users and Statistic channel Sector Cooperation (SSC) users based on a sector boundary user's speed, a sounding error, and a Tx antenna spatial correlation, and transmitting a signal by forming multiple Tx beams for concurrently supporting users having different user speeds and Tx antenna spatial correlations. Also, the present invention provides a method for determining an optimal number of users and an optimal user combination for multi-sector cooperative beamforming through the multiple Tx beams without distinction of the ISC and SSC users.

Figure 1:
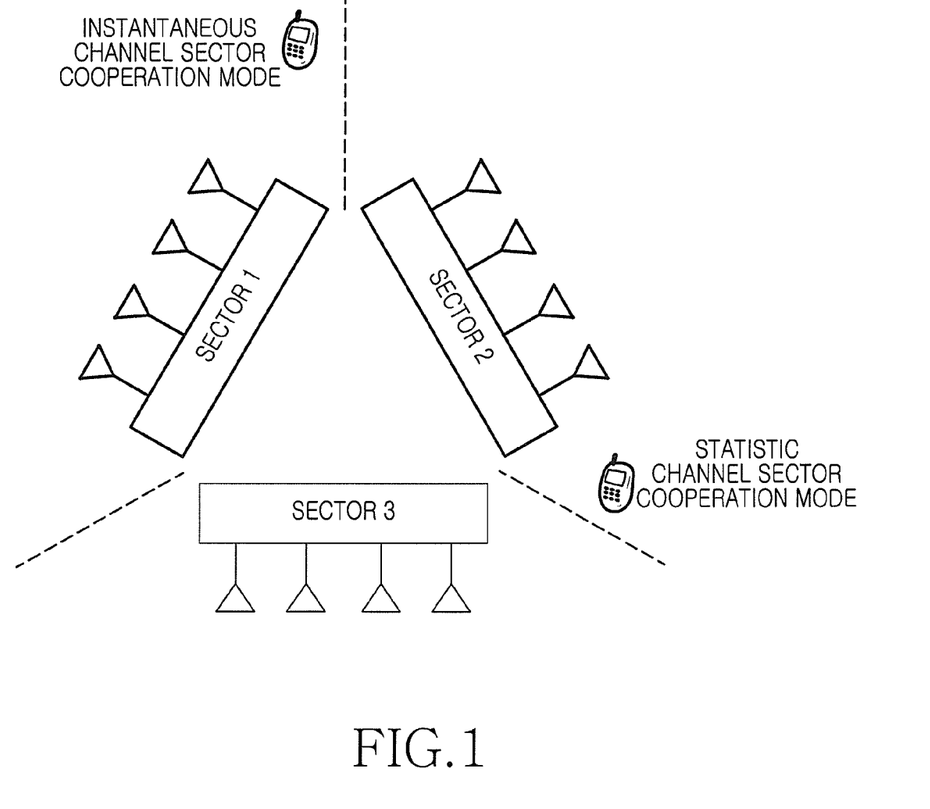
FIG. 1 is a diagram of a system environment for multi-sector cooperative transmission in a multi-antenna system according to an exemplary embodiment of the present invention.

FIG. 1 depicts a system environment for multi-sector cooperative transmission in a multi-antenna system according to an exemplary embodiment of the present invention.

Referring to FIG. 1, a downlink link of a multi-sector multi-user cellular system using multiple antennas with Tx antenna channel correlation is considered. It is assumed that K-ary user terminals equipped with a single Rx antenna are distributed in a sector boundary, and each sector of a base station includes M-ary Tx antennas. The base station is assumed to schedule and send L-ary ($\leq 2M$) users of the K-ary user terminals in total at a certain scheduling time through cooperation of two adjacent sectors. When $\alpha_{l,s}$ ($0 \leq \alpha_{l,s} \leq 1$) is defined as a channel path loss value between a sector s and a user terminal l, a channel vector $h_l$ between two sectors s and s' of the sector cooperation and the user terminal l is given by Equation 1.

$$h_l = \lfloor \alpha_{l,s} h_{l,1} \ldots \alpha_{l,s'} h_{l,2M} \rfloor \quad (1)$$

In particular, when a channel between the base station and the user terminal has correlation expressed as a Tx antenna channel correlation matrix $R_l$, the channel vector can be given by Equation 2.

$$h_l = \tilde{h}_l R_l^{1/2} \quad (2)$$

$\tilde{h}_l = \lfloor \alpha_{l,s} \tilde{h}_{l,1} \ldots \alpha_{l,s'} \tilde{h}_{l,2M} \rfloor$ is a complex Gaussian channel vector independent and identically distributed (i.i.d). The Tx antenna channel correlation matrix $R_l$ can be given by Equation 3.

$$R_l = \begin{bmatrix} E\{h_{l,1} h_{l,1}^*\} & \ldots & E\{h_{l,1} h_{l,2M}^*\} \\ \vdots & \ddots & \vdots \\ E\{h_{l,2M} h_{l,1}^*\} & \ldots & E\{h_{l,2M} h_{l,2M}^*\} \end{bmatrix} \quad (3)$$

$A^*$ denotes a Hermitian matrix of a matrix A, and $E\{A\}$ denotes an expected value.

The base station can obtain the channel vector $h_l$ through a channel sounding signal sent by the user terminal l. In so doing, a channel estimation vector $\hat{h}_l$ between the base station and the user terminal l can be given by Equation 4.

$$\hat{h}_l = h_l + \sigma_l z_l R_l^{1/2} \quad (4)$$

$\sigma_l$ denotes a sounding channel estimation Mean Squared Error (MSE) of the user terminal l, and $z_l$ denotes the i.i.d complex Gaussian vector with an average of 0 and a distribution of 1. A delayed channel vector $h_{\tau,l}$ of the user terminal l in a time varying channel environment can be given by Equation 5.

$$\hat{h}_{\tau,l} = \rho_{\tau,l} h_l + \sqrt{1 - \rho_{\tau,l}^2} z'_l R_l^{1/2} \quad (5)$$

$z'_l$ denotes a (1×2M) i.i.d complex Gaussian vector with the average of 0 and the distribution of 1, $\rho_{\tau,l}$ denotes a time correlation coefficient between the channel vector $h_l$ and the delayed channel vector $h_{\tau,l}$ of the user terminal l due to a transmission time delay, which can be expressed using a k-order Bessel function $J_k(\cdot)$ as shown in Equation 6.

$$\rho_{\tau,l} = J_0\left(\frac{2\pi f_c v_l \tau}{c}\right) + J_2\left(\frac{2\pi f_c v_l \tau}{c}\right) \quad (6)$$

$f_c$ denotes a Tx carrier frequency, $v_l$ denotes a user speed, and c denotes the velocity of light ($3 \times 10^8$=m/s). Based on Equation 4 and Equation 5, the delayed channel vector $h_{\tau,l}$ of the user terminal l can be given by Equation 7 by considering all of the sounding error $\rho_l$, the transmission time delay, and the Tx antenna spatial correlation $R_l$.

$$h_{\tau,l} = \rho_{\tau,l}\left(\frac{\bar{\alpha}_l^2}{\bar{\alpha}_l^2 + \sigma_l^2} \hat{h}_l + \frac{\bar{\alpha}_l \sigma_l}{\sqrt{\bar{\alpha}_l^2 + \sigma_l^2}} z_l R_l^{1/2}\right) + \bar{\alpha}_l^2 \sqrt{1 - \rho_{\tau,l}^2} z'_l R_l^{1/2} \quad (7)$$

$$\bar{\alpha}_l^2 = (\alpha_{l,s}^2 + \alpha_{l,s'}^2)/2$$

$\alpha_{l,s}$ denotes the channel path loss value between the sector s and the user terminal l. The present invention provides Tx beamforming and multi-user scheduling method and apparatus for the multi-sector cooperative transmission by analyzing a beamforming gain and an interference of the sector boundary user through the multi-section cooperative transmission by use of the delayed channel vector $h_{\tau,l}$ in consideration of all of the sounding error $\rho_l$, the transmission time delay $\tau$, and the Tx antenna spatial correlation $R_l$.

As stated earlier, a multi-sector cooperative beamforming scheme based on instantaneous channel information can attain a beamforming gain of maximum 2M times when the user's speed is low or there is no channel mismatch problem due to the sounding error. However, when the user's speed is high or the sounding error causes the channel mismatch problem, not only the beamforming gain is lowered but also the performance is quite degraded by multi-beam residual interference which increases in proportion to the transmission delay or a channel estimation error. By contrast, the multi-sector beamforming scheme based on statistic channel information is robust to the channel mismatch problem of the user and can attain the beamforming gain as much as a maximum eigen value $\lambda_{l,max}$ of eigen values $(\lambda_{l,1}, \ldots \lambda_{l,2M})$ produced when Eigen-Value Decomposition (EVD) is applied to the Tx antenna correlation matrix $R_l$. However, the value $k_{max}$ attainable through the multi-sector cooperation based on the statistic channel information is equal to or smaller than 2M. Hence, when the user's speed is low or there is no channel mismatch problem due to the sounding error, its obtainable capacity is limited compared to the multi-sector cooperative beamforming scheme based on the instantaneous channel information.

Thus, to achieve the optimal transmission performance according to a user's channel condition, the present invention classifies the user terminals of the sector boundary of FIG. 1 into an ISC mode and an SSC mode by considering the sounding error $\rho_l$, the transmission time delay $\tau$, and the Tx antenna spatial correlation $R_l$. In so doing, the present invention determines a transmission mode of the users based on an expected value of a maximum Signal-to-Interference plus Noise Ratio (SINR) obtainable when each user operates in the ISC mode or the SSC mode.

Figure 2:
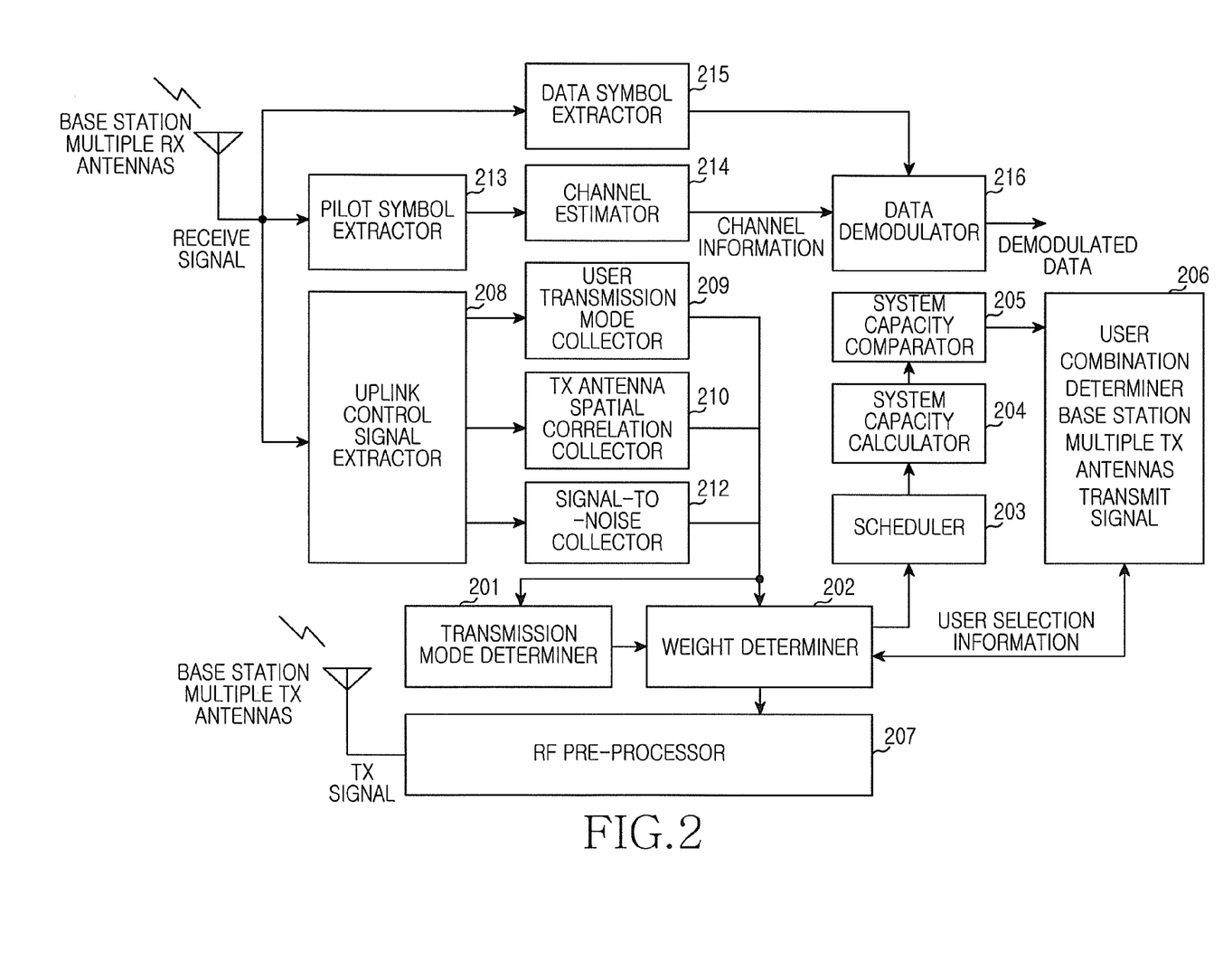
FIG. 2 is a block diagram of a base station for the multi-sector cooperative transmission in the multi-antenna system according to an exemplary embodiment of the present invention.

FIG. 2 is a block diagram of a base station for the multi-sector cooperative transmission in the multi-antenna system according to an exemplary embodiment of the present invention.

Referring to FIG. 2, the base station includes a pilot symbol extractor 213, a channel estimator 214, a data symbol extractor 215, a data demodulator 216, an uplink control signal extractor 208, a user transmission mode collector 209, a Tx antenna spatial correlation collector 210, a signal-to-noise collector 212, a system capacity comparator 205, a system capacity calculator 204, a scheduler 203, a transmission mode determiner 201, a weight determiner 202, a user combination determiner 206, and a Radio Frequency (RF) pre-processor 207.

The pilot symbol extractor 213 extracts a pilot symbol or a sounding symbol from a receive signal and provides the symbol to the channel estimator 214. The channel estimator 214 estimates a channel using the pilot symbol or the sounding symbol from the pilot symbol extractor 213 and provides a result to the data demodulator 216.

The data symbol extractor 215 extracts data symbols from the receive signal and provides the data symbols to the data demodulator 216. Based on the channel estimation result from the channel estimator 214, the data demodulator 216 demodulates the data symbols from the data symbol extractor 215.

The uplink control signal extractor 208 extracts an uplink control signal from the receive signal and provides uplink control signal information (Channel Quality Indicator (CQI), ACKnowledge (ACK)/Negative ACK (NACK), and Hybrid Automatic Repeat reQuest (HAQR)) to the user transmission mode collector 209, the Tx antenna spatial correlation collector 210, and the signal-to-noise collector 212. In addition, the uplink control signal extractor 208 receives and provides user's transmission mode (ISC, SSC) information determined by the transmission mode determiner 201 to the user transmission mode collector 209. According to implementations, the user transmission mode collector 209 can receive transmission mode information per user directly from the transmission mode determiner 201. The uplink control signal extractor 208 receives and provides channel matrix information from the channel estimator 214 to the Tx antenna correlation collector 210. According to implementations, the Tx antenna correlation collector 210 can receive channel matrix information per user directly from the channel estimator 214. The uplink control signal extractor 208 determines a ratio of the receive signal strength and the measured noise level per user and provides the result to the signal-to-noise collector 212.

The uplink control signal extractor 208 determines and provides the speed of the user terminal to the transmission mode determiner 201. Herein, the uplink control signal extractor 208 can measure the speed of the user terminal using a Doppler frequency, and utilize other general terminal speed measurement schemes which are well-known.

The user transmission mode collector 209 collects the transmission mode per user and provides the collected user transmission mode information to the weight determiner 202. The Tx antenna spatial correlation collector 210 determines the Tx antenna spatial correlation per user based on the channel matrix, and provides the result to the weight determiner 202 and the transmission mode determiner 201. The signal-to-noise collector 212 collects the ratio of the receive signal strength and the measured noise per user and provides the collected signal-to-noise ratio of the user to the weight determiner 202.

The transmission mode determiner 201 classifies the user terminals of the sector boundary to the ISC mode and the SSC mode by considering the sounding error $\rho_l$, the transmission time delay $\tau$, and the Tx antenna spatial correlation $R_l$. In so doing, the present invention determines the transmission mode of the users based on the expected value of the maximum SINR obtainable when each user operates in the ISC mode or the SSC mode.

Herein, when all of the sounding error $\rho_l$, the transmission time delay $\tau$, and the Tx antenna spatial correlation $R_l$ are considered, the expected value $\bar{\gamma}_l^{ISC}$ of the maximum SINR obtainable when the user terminal l operates in the ISC mode is given by Equation 8.

$$\bar{\gamma}_l^{ISC} = \gamma_{0,l} E \left\{ \left| h_{\tau,l} \frac{\hat{h}_l^*}{\sqrt{\|\hat{h}_l\|^2}} \right|^2 \right\} \qquad (8)$$

$$= \gamma_{0,l} \left( \frac{4\bar{\alpha}_l^4 \rho_{\tau,l}^2 M^2 + \bar{\alpha}_l^2 (\rho_{\tau,l}^2 \sigma_l^2 + (1-\rho_{\tau,l}^2)(\bar{\alpha}_l^2 + \sigma_l^2))\sum_{i=1}^{2M} \lambda_{l,i}^2}{2M(\bar{\alpha}_l^2 + \sigma_l^2)} \right)$$

E[X] denotes an expected value of a random variable X, and $\gamma_{0,l}$ denotes an average SINR value of the user terminal l.

By contrast, the expected value $\bar{\gamma}_l^{SSC}$ of the maximum SINR obtainable when the user terminal l operates in the SSC mode is given by Equation 9.

$$\overline{\gamma}_l^{SSC} = \gamma_{0,l} E\{|h_{\tau,l} u_{l,max}|^2\} \qquad (9)$$
$$= \gamma_{0,l} tr(R_l u_{l,max} u_{l,max}^*)$$
$$= \gamma_{0,l} \lambda_{l,max}$$

$u_{l,max}$ denotes an eigen vector corresponding to the maximum eigen value $\lambda_{l,max}$ of the eigen values produced when the EVD is applied to the Tx antenna correlation matrix $R_l$, and tr(A) denotes a trace operator of a matrix A.

Hence, based on the expected value of the maximum SINR obtainable when the multiple users operate in the ISC mode or the SSC mode, the transmission mode determiner 201 determines the transmission mode of each user in accordance with Equation 10.

$$\overline{\gamma}_l^{ISC} \underset{ISC}{\overset{SSC}{\lessgtr}} \overline{\gamma}_l^{SSC} \qquad (10)$$

That is, the transmission mode determiner 201 determines the transmission mode of the user terminal 1 by comparing $\overline{\gamma}_l^{ISC}$ and $\overline{\gamma}_l^{SSC}$.

Meanwhile, the base station determines multiple Tx beams for concurrently servicing the users of not only the same mode but also the different modes by considering the users' speed, the sounding error, and the Tx antenna spatial correlation. When servicing the multiple users at the same time, it is important to determine the multiple Tx beams so as to maximize the beamforming gain obtainable by the user and to minimize the inter-beam interference caused by the multiple beams. Thus, the present invention determines $w_l$ to maximize the beamforming gain obtainable by the user terminal 1 through the Tx beam $w_l$ of the user terminal 1 and to minimize the multi-user interference caused by $w_l$. It is assumed that L-ary users are serviced at the same time regardless of the transmission mode of the users, $N_{SSC}$ denotes the number of the SSC mode users, $N_{ISC}$ denotes the number of the ISC mode users, and $J_l(L)$ denotes total interference affecting other users serviced at the same time. To ease the understanding, provided that the users 1 through $N_{ISC}$ are the ISC mode users and the users ($N_{ISC}$+1) through L are the SSC mode users, $J_l(L)$ can be given by Equation 11.

$$J_l(L) = \sum_{i=1, i \neq l}^{N_{ISC}} w_l^* h_i^* h_i w_l + \sum_{j=N_{ISC}+1, j \neq l}^{L} E\{w_l^* h_j^* h_j w_l\} \qquad (11)$$
$$= w_l^* \left( \sum_{i=1, i \neq l}^{N_{ISC}} h_i^* h_i + \sum_{j=N_{ISC}+1, j \neq l}^{L} E\{h_j^* h_j\} \right) w_l$$
$$= w_l^* \left( \sum_{i=1, i \neq l}^{N_{ISC}} h_i^* h_i + \sum_{j=N_{ISC}+1, j \neq l}^{L} R_j^* \right) w_l$$

In so doing, the Tx beam $w_l$ of the ISC user 1 can be calculated based on Equation 12 by considering an instantaneous beamforming gain $w_l^* h_l^* h_l w_l$ due to $w_l$ and the channel noise value of Equation 11.

$$w_l = \underset{w_l : \|w_l\|_F = 1}{\operatorname{argmax}} \frac{w_l^* h_l^* h_l w_l}{J_l(L) + N_0} \qquad (12)$$

$$= \underset{w_l : \|w_l\|_F = 1}{\operatorname{argmax}} \frac{w_l^* h_l^* h_l w_l}{w_l^* \left( \sum_{i=1, i \neq l}^{N_{ISC}} h_i^* h_i + \sum_{j=N_{ISC}+1, j \neq l}^{L} R_j \right) w_l + N_0}$$

$$= \xi_{max}\left( \left( \sum_{i=1, i \neq l}^{N_{ISC}} h_i^* h_i + \sum_{j=N_{ISC}+1, j \neq l}^{L} R_j + N_0 I_{2M} \right)^{-1} h_l^* h_l \right)$$

$N_0$ denotes a noise power spectral density, $I_{2M}$ denotes a 2M×2M identity matrix, and $\xi_{max}(A)$ denotes an eigen vector corresponding to the maximum eigen value of the matrix A. By contrast, the Tx beam $w_l$ of the SSC user 1 can be calculated based on Equation 13 by considering a statistic beamforming gain $w_l^* E\{h_l^* h_l\} w_l = w_l^* R_l w_l$ due to $w_l$ and Equation 11.

$$w_l = \underset{w_l : \|w_l\|_F = 1}{\operatorname{argmax}} \frac{w_l^* R_l w_l}{J_l(L) + N_0} \qquad (13)$$

$$= \underset{w_l : \|w_l\|_F = 1}{\operatorname{argmax}} \frac{w_l^* R_l w_l}{w_l^* \left( \sum_{i=1, i \neq l}^{N_{ISC}} h_i^* h_i + \sum_{j=N_{ISC}+1, j \neq l}^{L} R_j \right) w_l + N_0}$$

$$= \xi_{max}\left( \left( \sum_{i=1, i \neq l}^{N_{ISC}} h_i^* h_i + \sum_{j=N_{ISC}+1, j \neq l}^{L} R_j + N_0 I_{2M} \right)^{-1} R_l \right)$$

That is, the weight determiner 202 determines the multiple Tx beams of every terminal in the cell boundary using Equation 12 and Equation 13, based on the transmission mode of the user terminal determined by the transmission mode determiner 201. The weight determiner 202 determines the multiple Tx beams for a user combination $\Omega_n$ of Equation 16 based on Equation 12 and Equation 13, and provides a result to the RF pre-processor 207.

The present invention determines a beamforming weight based on Equation 12 or Equation 13 by taking into account the beamforming gain obtainable by each user and the multi-user interference. In particular, since the SSC user determines the beamforming weight using the statistic channel information $R_l$, it is quite robust to the channel mismatch problem caused by the user speed and the sounding error.

The RF pre-processor 207 sends a data signal through the multiple Tx beams corresponding to an optimal scheduling user combination $\Omega_{\hat{n}}$ from the weight determiner 202.

The scheduler 203 schedules the user terminals with the transmission mode and the weight determined, and provides a result to the system capacity calculator 204.

That is, the number of combinations for selecting users from the users at a certain scheduling time is $_KC_L$, where $_KC_L \doteq K!/((K-L)!L!)$ and $$L! \doteq \sum_{i=1}^{L} C_L.$$

Accordingly, the number of cases for selecting L(1≤L≤2M)-ary users and the user combination for maximizing the system channel capacity from the K-ary users regardless of the transmission mode of the users is $$N = \sum_{L=1}^{2M} {}_K C_L$$

in total, and is a set including the user combination as its elements.

When the multiple Tx beam is applied based on this, the system capacity calculator 204 calculates the system channel capacity according to the scheduling user combination $\Omega_n$ and the number of the scheduling users L based on Equation 14, and provides a result to the system capacity calculator 204.

$$C(\Omega_n) = \sum_{l=1}^{N_{ISC}} \log_2\left(1 + \gamma_{\tau,\pi_l}^{ISC}(L)\right) + \sum_{k=1}^{N_{SSC}} \log_2\left(1 + \overline{\gamma}_{\tau,\pi'_k}^{SSC}(L)\right) \quad (14)$$

$\pi_l$ denotes an index of the 1-th ISC mode user in $\Omega_n$, and $\pi'_k$ denotes an index of the k-th SSC mode user in $\Omega_n$.

When the L-ary users are serviced at the same time, the SINR value of the ISC mode user l can be given by Equation 15.

$$\overline{\gamma}_l^{ISC}(L) = \frac{\gamma_{0,l}\left(\frac{\overline{\alpha}_l^4 \rho_{\tau,l}^2}{(\overline{\alpha}_l^2 + \sigma_l^2)^2}|\hat{h}_l w_l|^2 + \overline{\alpha}_l^2\left(\frac{\rho_{\tau,l}^2 \sigma_l^2}{\overline{\alpha}_l^2 + \sigma_l^2} + 1 - \rho_{\tau,l}^2\right)tr(R_l w_l w_l^*)\right)}{\gamma_{0,l}\sum_{i=1,i\neq l}^{L}\left(\frac{\overline{\alpha}_l^4 \rho_{\tau,l}^2}{(\overline{\alpha}_l^2 + \sigma_l^2)^2}|\hat{h}_l w_l|^2 + \overline{\alpha}_l^2\left(\frac{\rho_{\tau,l}^2 \sigma_l^2}{\overline{\alpha}_l^2 + \sigma_l^2} + 1 - \rho_{\tau,l}^2\right)tr(R_l w_l w_l^*)\right) + 1} \quad (15)$$

tr(A) denotes the trace operator of the matrix A. By contrast, when the L-ary users are serviced at the same time, the expected value of the SINR obtainable by the SSC mode user l can be given by Equation 16.

$$\overline{\gamma}_l^{SSC}(L) = \frac{\gamma_{0,l}\sum_{m=1}^{2M} \lambda_{l,m}\cos^2 \angle(u_{l,m}, w_l)}{\gamma_{0,l}\sum_{i=1,i\neq l}^{L}\sum_{m=1}^{2M} \lambda_{l,m}\cos^2 \angle(u_{l,m}, w_l) + 1} \quad (16)$$

$\angle(u_{l,m}, w_l)$ denotes an angle difference between a vector $u_{l,m}$ and $w_l$. Based on this analysis result, the present invention determines the optimal number of users and user combination for the multi-sector cooperative beamforming. The base station selects the number of users L and the user combination for maximizing the system channel capacity among the K-ary users using Equation 14 and Equation 15.

The system capacity comparator 205 compares the system channel capacity according to the scheduling user combination and the scheduling user number and provides a result to the user combination determiner 206.

The user combination determiner 206 determines the scheduling user combination $\Omega_{\tilde{n}}$ and the scheduling user number for maximizing the system channel capacity based on Equation 17. Herein, the user combination $\Omega_{\tilde{n}}$ for maximizing the system capacity can be given by Equation 17.

$$\Omega_{\tilde{n}} = \underset{\Omega_n \in G}{\operatorname{argmax}} C(\Omega_n) \quad (17)$$

As stated above, the present invention can support the users having the different speeds and Tx antenna spatial correlations and concurrently enhance the overall system capacity performance by determining the number of the users and the user combination $\Omega_{\tilde{n}}$ for maximizing the system channel capacity based on Equation 14 and Equation 17, and transmitting the signal through the multiple Tx beams for simultaneously supporting the users of the different speeds and Tx antenna spatial correlations.

Figure 3:
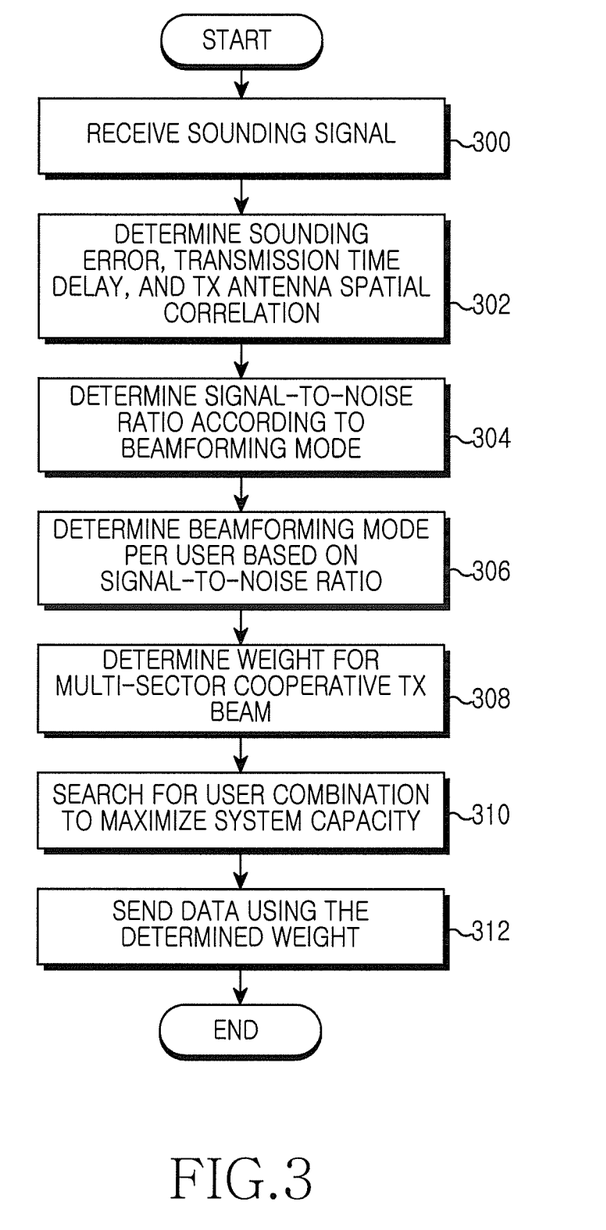
FIG. 3 is a flowchart of base station operations for the multi-sector cooperative transmission in the multi-antenna system according to an exemplary embodiment of the present invention.

FIG. 3 is a flowchart of base station operations for the multi-sector cooperative transmission in the multi-antenna system according to an exemplary embodiment of the present invention.

Referring to FIG. 3, the base station receives the sounding signal from the terminal in step 300, and determines the sounding error, the transmission time delay, and the Tx antenna spatial correlation in step 302.

Next, the base station determines the signal-to-noise ratio according to the beamforming mode in step 304. That is, the base station determines the expected value $\overline{\gamma}_l^{ISC}$ of the maximum SINR obtainable when the user terminal l operates in the ISC mode and the expected value $\overline{\gamma}_l^{SSC}$ of the maximum SINR obtainable when the user terminal l operates in the SSC mode (see Equation 8 and Equation 9).

In step 306, the base station determines the beamforming mode per user based on the signal-to-noise ratio according to the beamforming mode. For example, when $\overline{\gamma}_l^{ISC}$ is greater than $\overline{\gamma}_l^{SSC}$, the base station determines the user terminal l in the ISC mode. When $\overline{\gamma}_l^{ISC}$ is smaller than $\overline{\gamma}_l^{SSC}$, the base station determines the user terminal l in the SSC mode.

When servicing the multiple users with respect to the user terminals with the beamforming mode determined, the base station determines the weight to maximize the beamforming gain obtainable by each user and to minimize the inter-beam interference caused by the multiple beams in step 308.

In step 310, the base station determines the number of the users and the user combination $\Omega_{\tilde{n}}$ for maximizing the system channel capacity, based on the SINR value of the ISC mode user l when the L-ary users are serviced at one time and the SINR value of the SSC mode user l when the L-ary users are serviced at one time (see Equation 14 and Equation 17).

In step 312, the base station sends a data signal through the multiple Tx beams corresponding to the optimal scheduling user combination $\Omega_{\tilde{n}}$.

Figure 4:
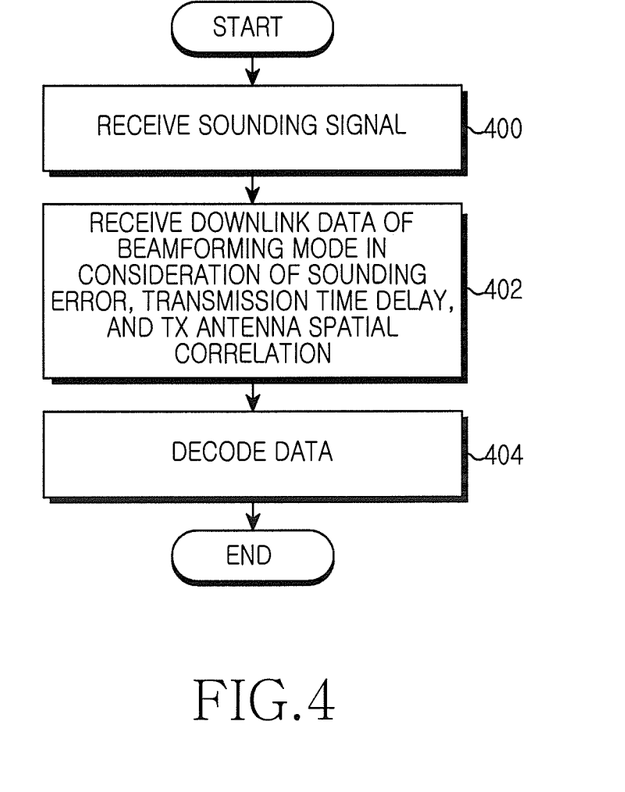
FIG. 4 is a flowchart of terminal operations for the multi-sector cooperative transmission in the multi-antenna system according to an exemplary embodiment of the present invention.

FIG. 4 is a flowchart of terminal operations for the multi-sector cooperative transmission in the multi-antenna system according to an exemplary embodiment of the present invention.

Referring to FIG. 4, the terminal sends the sounding signal to a serving base station (or a serving sector and adjacent sectors) in step 400, and receives downlink data of the beamforming mode in consideration of the sounding error, the transmission time delay, and the Tx antenna spatial correlation in step 402.

In step 404, the terminal decodes the downlink data.

Figure 5:
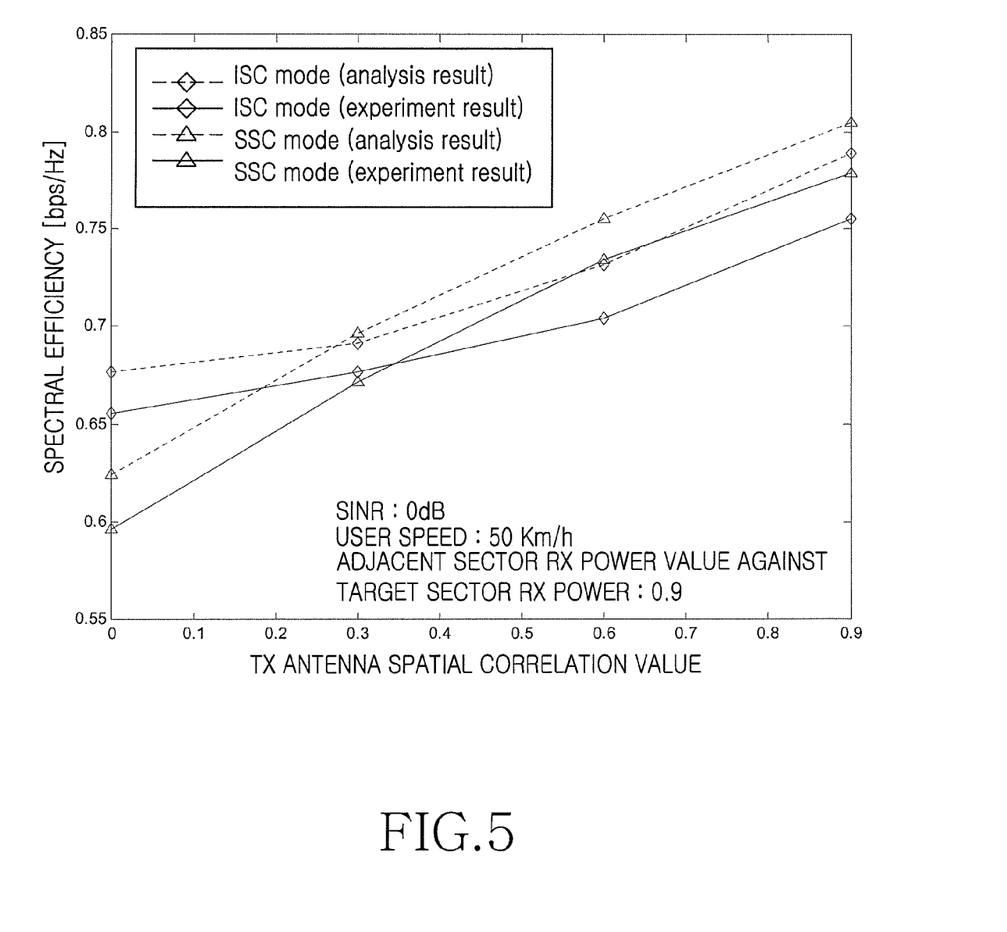
FIG. 5 is a graph of a performance per transmission mode according to a Tx antenna spatial correlation value according to an exemplary embodiment of the present invention.

FIG. 5 is a graph of the performance per transmission mode according to the Tx antenna spatial correlation according to an exemplary embodiment of the present invention.

Referring to FIG. 5, intersections of the transmission modes according to performance analysis results per mode approximately correspond to intersections of the transmission modes according to experiment results per mode. When the spatial correlation of the Tx antenna is greater than about 0.3, both of the analysis results and the actual experiment results show that the transmission in the statistic channel sector cooperative mode exhibits better performance than the transmission in the instantaneous channel sector cooperative mode.

Figure 6:
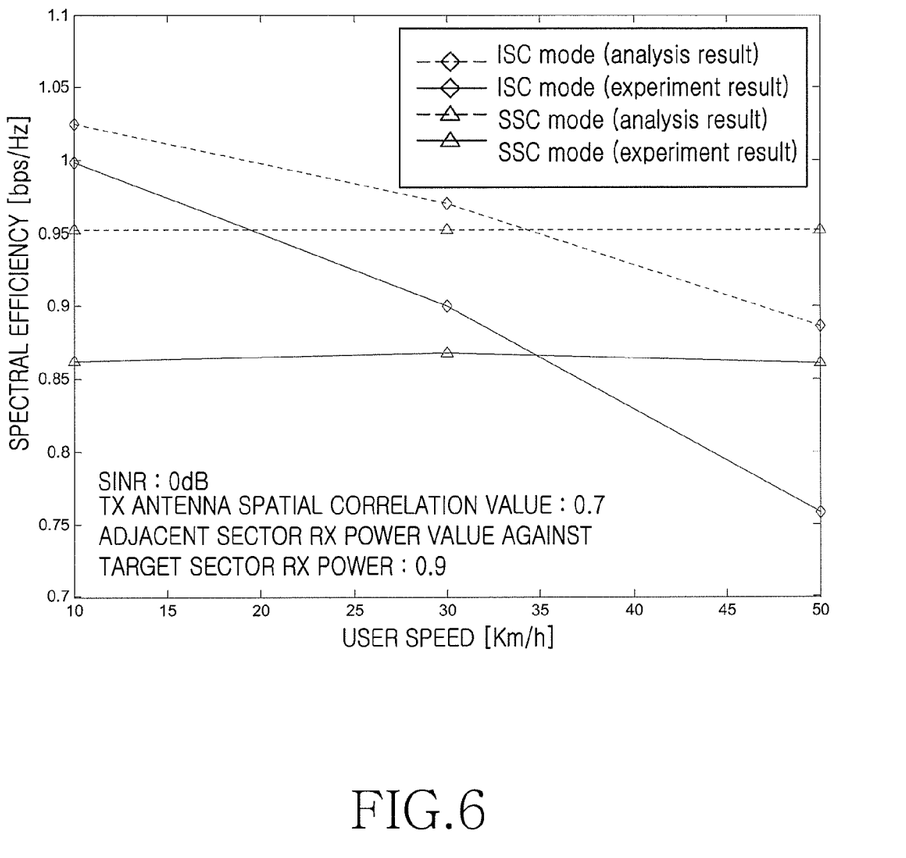
FIG. 6 is a graph of the performance per transmission mode according to a user speed according to an exemplary embodiment of the present invention.

FIG. 6 is a graph of the performance per transmission mode according to the user speed according to an exemplary embodiment of the present invention.

Referring to FIG. 6, similar to FIG. 3, intersections of the transmission modes according to performance analysis results per mode approximately correspond to intersections of the transmission modes according to experiment results per mode. When the user's speed is greater than about 35 km/h, both of the analysis results and the actual experiment results show that the transmission in the statistic channel sector cooperative mode exhibits better performance than the transmission in the instantaneous channel sector cooperative mode.

Figure 7:
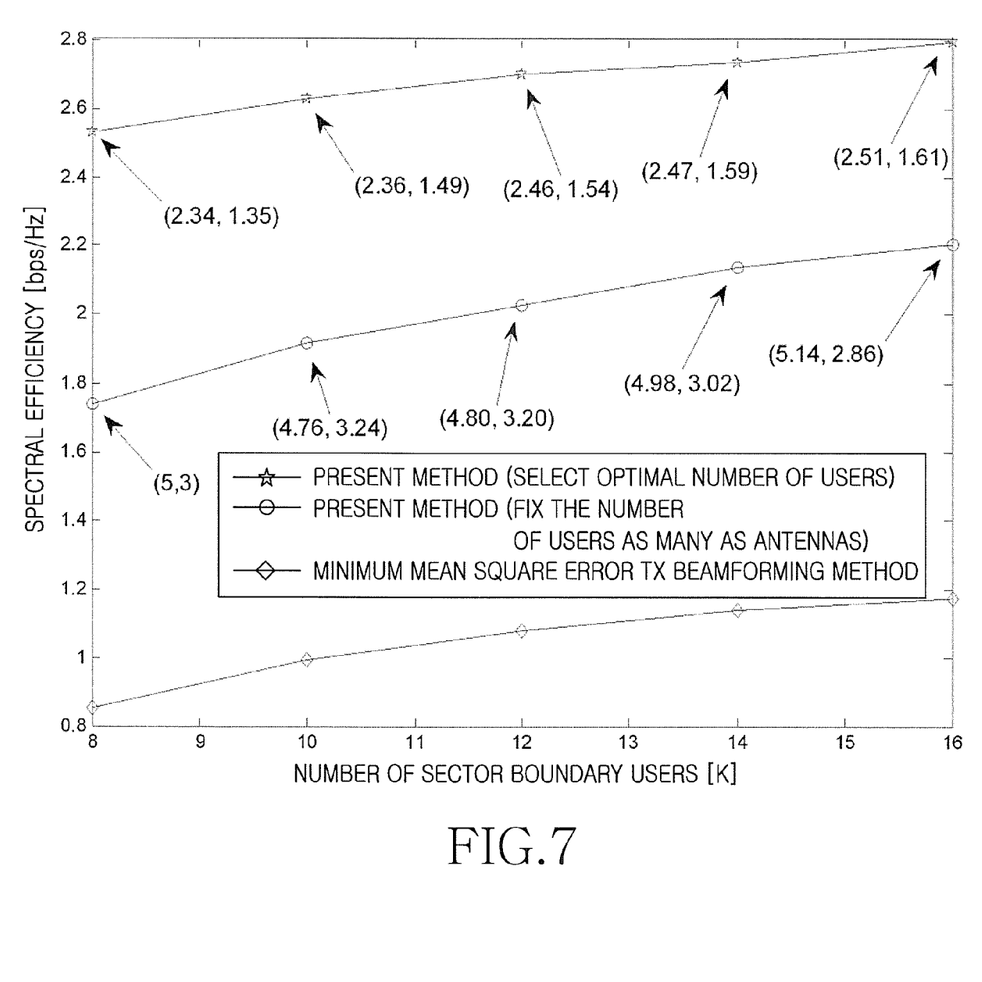
FIG. 7 is a graph of the performance of the present method according to the number of users K according to an exemplary embodiment of the present invention.

FIG. 7 is a graph of a performance of the present method according to the number of users K according to an exemplary embodiment of the present invention.

Referring to FIG. 7, the performance of the present invention is better than a Minimum Mean Square Error (MMSE)-based sector cooperative beamforming scheme using only the instantaneous channel information. This is because the present invention can enhance the overall system capacity by forming the multi-sector cooperative Tx beam for supporting the ISC and SSC mode users all together based on the transmission mode and feedback channel information of the users, and determining the optimal number of user and user combination for the multi-sector cooperative beamforming regardless of the ISC and SSC users. However, the MMSE-based sector cooperative beamforming scheme, which is based on the instantaneous channel information, is quite vulnerable to the channel mismatch problem caused by the user's speed and the sounding error, and considerably degrades the multi-sector cooperative transmission performance because it cannot select the optimal number of users and user combination for maximizing the system capacity when the multi-user scheduling is conducted without considering the performance degradation due to the channel mismatch problem.

As set forth above, using these features, the present invention can divide the sector boundary users to the ISC users and the SSC users based on the speed, the sounding error, and the Tx antenna spatial correlation, and send the signal by forming the multiple Tx beams for supporting the users of the different speeds and Tx antenna spatial correlations, to thus enhance the overall system capacity.

In addition, the present invention can determine the optimal number of the users and user combination for the multi-sector cooperative beamforming without distinction of the ISC and SSC users through the multiple Tx beams, and thus provide high system capacity in the multi-user environment of different channel conditions.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A transmit (Tx) beamforming method for multi-sector cooperative transmission in a multi-antenna system, the method comprising:
   determining a transmission mode of sector boundary users according to a channel condition;
   determining a multi-sector cooperative Tx beam for supporting multiple users based on the transmission mode of the sector boundary users;
   determining a user combination for multi-sector cooperative beamforming by considering the determined multi-sector cooperative Tx beam; and
   performing sector cooperative Tx beamforming with the determined user combination.

2. The Tx beamforming method of claim 1, wherein determining the transmission mode of the sector boundary users according to the channel condition comprises:
   determining a first maximum Signal-to-Interference plus Noise Ratio (SINR) when a user operates in a first transmission mode, and a second maximum SINR when the user operates in a second transmission mode; and
   determining the transmission mode by comparing the first maximum SINR and the second maximum SINR,
   wherein the first transmission mode is selected when the first maximum SINR is greater than the second maximum SINR, and the second transmission mode is selected when the first maximum SINT(is smaller than the second maximum SINR.

3. The Tx beamforming method of claim 2, wherein the first transmission mode is an Instantaneous channel Sector Cooperation (ISC) mode, and the second transmission mode is a Statistic channel Sector Cooperation (SSC) mode.

4. The Tx beamforming method of claim 2, wherein the first maximum SINR and the second maximum SINR are determined by considering at least one of a sounding error, a transmission time delay, or a Tx antenna spatial correlation.

5. The Tx beamforming method of claim 2, wherein the first maximum SINR $\bar{\gamma}_l^{ISC}$ and the second maximum SINR $\bar{\gamma}_l^{SSC}$ are estimated based on the following equation:

$$\bar{\gamma}_l^{ISC} = \gamma_{0,l} E\left\{\left|h_{\tau,l} \frac{\hat{h}_l^*}{\sqrt{\|\hat{h}_l\|^2}}\right|^2\right\}$$

$$= \gamma_{0,l}\left(\frac{4\bar{\alpha}_l^4 \rho_{\tau,l}^2 M^2 + \bar{\alpha}_l^2(\rho_{\tau,l}^2 \sigma_l^2 + (1-\rho_{\tau,l}^2)(\bar{\alpha}_l^2 + \sigma_l^2))\sum_{i=1}^{2M}\lambda_{l,i}^2}{2M(\bar{\alpha}_l^2 + \sigma_l^2)}\right)$$

$$\bar{\gamma}_l^{SSC} = \gamma_{0,l} E\{|h_{\tau,l} u_{l,max}|^2\}$$

$$= \gamma_{0,l} tr(R_l u_{l,max} u_{l,max}^*)$$

$$= \gamma_{0,l} \lambda_{l,max}$$

where M denotes a number of Tx antennas per sector, E[X] denotes an expected value of a random variable X, $\gamma_{0,l}$ denotes an average SINR value of a user terminal l, $\hat{h}_l$ denotes a channel estimation vector between the base station and the user terminal l, A* denotes a Hermitian matrix of a matrix A, $h_{\tau,l}$ denotes a delayed channel vector of the user terminal l considering a sounding error $\rho_l$, a transmission time delay, and a Tx antenna spatial correlation $R_l$, $\bar{\alpha}_l^2 = (\alpha_{l,s}^2 + \alpha_{l,s'}^2)/2$ denotes an average value of channel path loss values between adjacent two sectors of sector cooperation and a user, $\alpha_{l,s}$ denotes a channel path loss between a sector s and the user terminal l, M denotes a number of the Tx antennas, $\alpha_l$ denotes a sounding channel estimation Mean Squared Error (MSE) of the user terminal l, $\rho_{\tau,l}$ denotes a time correlation coefficient between a channel vector $h_l$ and the delayed channel vector $h_{\tau,l}$ of the user terminal l due to the transmission time delay, and $\lambda_{l,i}$ denotes an eigen value when Eigen-Value Decomposition (EVD) is applied to the Tx antenna correlation matrix $R_l$, where $u_{l,max}$ denotes an eigen vector corresponding to a maximum eigen value $\lambda_{l,max}$ of eigen values produced when the EVD is applied to the Tx antenna correlation matrix $R_l$, and tr(A) denotes a trace operator of a matrix A.

6. The Tx beamforming method of claim 5, wherein $\rho_{\tau,l}$ is defined using a k-order Bessel function based on the following equation:

$$\rho_{\tau,l} = J_0\left(\frac{2\pi f_c v_l \tau}{c}\right) + J_2\left(\frac{2\pi f_c v_l \tau}{c}\right)$$

where $f_c$ denotes a transmission carrier frequency, $v_l$ denotes a user speed, and a c denotes the velocity of light.

7. The Tx beamforming method of claim 1, wherein determining the multi-sector cooperative Tx beam for supporting the multiple users based on the transmission mode of the sector boundary users comprises determining the Tx beam of first transmission mode and second transmission mode users so as to increase a beamforming gain obtainable by the multiple users and to reduce inter-beam interference caused by multiple beams.

8. The Tx beamforming method of claim 7, wherein the Tx beam of the first transmission mode and second transmission mode users is determined based on the following equation:

$$w_l = \xi_{max}\left(\left(\sum_{i=1,i\neq l}^{N_{ISC}} h_i^* h_i + \sum_{j=N_{ISC}+1, j\neq l}^{L} R_j + N_0 I_{2M}\right)^{-1} h_l^* h_l\right)$$

$$w_l = \xi_{max}\left(\left(\sum_{i=1,i\neq l}^{N_{ISC}} h_i^* h_i + \sum_{j=N_{ISC}+1, j\neq l}^{L} R_j + N_0 I_{2M}\right)^{-1} R_l\right)$$

where $N_o$ denotes a noise power spectral density, L denotes a number of users serviced at the same time, $N_{ISC}$ denotes the first transmission mode user serviced concurrently among the L-ary users, $I_{2M}$ denotes a 2Mx2M identity matrix, $\xi_{max}(A)$ denotes an eigen vector corresponding to a maximum eigen value of a matrix A, and $R_l$ denotes a Tx antenna channel correlation matrix.

9. The Tx beamforming method of claim 8, wherein $R_l$ is defined based on the following equation:

$$R_l = \begin{bmatrix} E\{h_{l,1}h_{l,1}^*\} & \cdots & E\{h_{l,1}h_{l,2M}^*\} \\ \vdots & \ddots & \vdots \\ E\{h_{l,2M}h_{l,1}^*\} & \cdots & E\{h_{l,2M}h_{l,2M}^*\} \end{bmatrix}$$

where A* denotes a Hermitian matrix of the matrix A, and E{A} denotes an expected value.

10. The Tx beamforming method of claim 1, wherein determining the user combination for the multi-sector cooperative beamforming by considering the determined multi-sector cooperative Tx beam comprises:

calculating a system channel capacity according to every scheduling user combination and every number of scheduling users for the multi-sector cooperative Tx beamforming;

comparing, the calculated system channel capacity; and determining an optimal scheduling user combination and an optimal number of scheduling users for maximizing the system channel capacity based on a result of the comparing.

11. The Tx beamforming method of claim 10, wherein, when $G=\{\Omega_1, \ldots, \Omega_N\}$ denotes a set indicating every selectable scheduler user number and user combination among K-ary users and $\Omega_N$ denotes an n-th element of the set G, the calculating of the system channel capacity determines the system channel capacity according to $\Omega_N$ based on the following equation:

$$C(\Omega_n) = \sum_{l=1}^{N_{ISC}} \log_2\left(1 + \overline{\gamma}_{\tau,\pi_l}^{ISC}(L)\right) + \sum_{k=1}^{N_{SSC}} \log_2\left(1 + \overline{\gamma}_{\tau,\pi'_k}^{SSC}(L)\right)$$

where $\pi_l$ denotes an index of an l-th ISC mode user in $\Omega_n$, $\pi'_k$ denotes an index of a k-th SSC mode user in $\Omega_n$, $\overline{\gamma}_l^{ISC}$ denotes an SINR value of the first transmission mode user l when the L-ary users are serviced at the same time, and $\overline{\gamma}_l^{SSC}$ denotes an SINR value of the second transmission mode user l when the L-ary users are serviced at the same time, $$\overline{\gamma}_l^{ISC}(L) = \frac{\gamma_{0,l}\left(\frac{\alpha_l^4 \rho_{\tau,l}^2}{(\overline{\alpha}_l^2 + \sigma_l^2)^2}|\hat{h}_l w_l|^2 + \overline{\alpha}_l^2\left(\frac{\rho_{\tau,l}^2 \sigma_l^2}{\overline{\alpha}_l^2 + \sigma_l^2} + 1 - \rho_{\tau,l}^2\right)tr(R_l w_l w_l^*)\right)}{= \gamma_{0,l}\sum_{i=1,i\neq l}^{L}\frac{\alpha_l^4 \rho_{\tau,l}^2}{(\overline{\alpha}_l^2 + \sigma_l^2)^2}|\hat{h}_l w_l|^2 + \overline{\alpha}_l^2\left(\frac{\rho_{\tau,l}^2 \sigma_l^2}{\overline{\alpha}_l^2 + \sigma_l^2} + 1 - \rho_{\tau,l}^2\right)tr(R_l w_l w_l^*) + 1}$$

$$\overline{\gamma}_l^{SSC}(L) = \frac{\gamma_{0,l}\sum_{m=1}^{2M}\lambda_{l,m}\cos^2\angle(u_{l,m}, w_l)}{\gamma_{0,l}\sum_{i=1,i\neq l}^{L}\sum_{m=1}^{2M}\lambda_{l,m}\cos^2\angle(u_{l,m}, w_l) + 1}$$

where tr(A) denotes a trace operator of a matrix A, and $\angle(u_{l,m}, w_l)$ denotes an angle difference between a vector $u_{l,m}$ and $w_l$.

12. The Tx beamforming method of claim 10, wherein determining the optimal scheduling user combination and the optimal number of the scheduling users for maximizing the system channel capacity comprises determining a number of users $\hat{L}$ and a user combination $\Omega_{\hat{n}}$ for maximizing the multi-sector cooperative transmission system channel capacity based on the following equation:

$$\Omega_{\hat{n}} = \underset{\Omega_n \in G}{\mathrm{argmax}} C(\Omega_n).$$

13. A transmit (Tx) beamforming apparatus for multi-sector cooperative transmission in a multi-antenna system, the apparatus comprising:

a transmission mode determiner configured to determine a transmission mode of sector boundary users according to a channel condition;

a weight determiner configured to determine a multi-sector cooperative Tx beam for supporting multiple users based on the transmission mode of the sector boundary users;
a user combination determiner configured to determine a user combination for multi-sector cooperative beamforming by considering the determined multi-sector cooperative Tx beam; and
a Radio Frequency (RF) pre-processor configured to perform sector cooperative Tx beamforming with the determined user combination.

14. The Tx beamforming apparatus of claim 13, wherein the transmission mode determiner is configured to:
determine a first maximum Signal-to-Interference plus Noise Ratio (SINR) when a user operates in a first transmission mode, and a second maximum SINR when the user operates in a second transmission mode, and
determine the transmission mode by comparing the first maximum SINR and the second maximum SINR.

15. The Tx beamforming apparatus of claim 14, wherein the first transmission mode is an Instantaneous channel Sector Cooperation (ISC) mode, and the second transmission mode is a Statistic channel Sector Cooperation (SSC) mode.

16. The Tx beamforming apparatus of claim 14, wherein the first maximum SINR and the second maximum SINR are determined by considering at least one of a sounding error, a transmission time delay, or a Tx antenna spatial correlation.

17. The Tx beamforming apparatus of claim 14, wherein the first maximum SINR $\overline{\gamma}_l^{ISC}$ and the second maximum SINR $\overline{\gamma}_l^{SSC}$ are estimated based on the following equation:

$$\overline{\gamma}_l^{ISC} = \gamma_{0,l} E\left\{\left|h_{\tau,l}\frac{\hat{h}_l^*}{\sqrt{\|\hat{h}_l\|^2}}\right|^2\right\}$$

$$= \gamma_{0,l}\left(\frac{4\overline{\alpha}_l^4 \rho_{\tau,l}^2 M^2 + \overline{\alpha}_l^2(\rho_{\tau,l}^2\sigma_l^2 + (1-\rho_{\tau,l}^2)(\overline{\alpha}_l^2 + \sigma_l^2))\sum_{i=1}^{2M}\lambda_{l,i}^2}{2M(\overline{\alpha}_l^2 + \sigma_l^2)}\right)$$

$$\overline{\gamma}_l^{SSC} = \gamma_{0,l} E\{|h_{\tau,l}u_{l,max}|^2\}$$
$$= \gamma_{0,l} tr(R_l u_{l,max} u_{l,max}^*)$$
$$= \gamma_{0,l}\lambda_{l,max}$$

where M denotes a number of Tx antennas per sector, E[X] denotes an expected value of a random variable X, $\gamma_{0,l}$ denotes an average SINR value of a user terminal l, $\hat{h}_l$ denotes a channel estimation vector between the base station and the user terminal l, A* denotes a Hermitian matrix of a matrix A, $h_{\tau,l}$ denotes a delayed channel vector of the user terminal l considering a sounding error $\rho_l$, a transmission time delay, and a Tx antenna spatial correlation $R_l$, $\overline{\alpha}_l^2 = (\alpha_{l,s}^2 + \alpha_{l,s'}^2)/2$ denotes an average value of channel path loss values between adjacent two sectors of sector cooperation and a user, $\alpha_{l,s}$ denotes a channel path loss between a sector s and the user terminal l, M denotes a number of the Tx antennas, $\sigma_l$ denotes a sounding channel estimation Mean Squared Error (MSE) of the user terminal l, $\rho_{\tau,l}$ denotes a time correlation coefficient between a channel vector $h_l$ and the delayed channel vector $h_{\tau,l}$ of the user terminal l due to the transmission time delay, and $\lambda_{l,i}$ denotes an eigen value when Eigen-Value Decomposition (EVD) is applied to the Tx antenna correlation matrix $R_l$,
where $u_{l,max}$ denotes an eigen vector corresponding to a maximum eigen value $\lambda_{l,max}$ of eigen values produced when the EVD is applied to the Tx antenna correlation matrix $R_l$, and tr(A) denotes a trace operator of a matrix A.

18. The Tx beamforming apparatus of claim 13, wherein the user combination determiner comprises:
a calculator configured to calculate a system channel capacity according to every scheduling user combination and every number of scheduling users for the multi-sector cooperative Tx beamforming;
a comparator configured to compare the calculated system channel capacity; and
a scheduler configured to determine an optimal scheduling user combination and an optimal number of scheduling users for maximizing the system channel capacity based on a result of the comparator.

19. The Tx beamforming apparatus of claim 13, wherein to determine the multi-sector cooperative Tx beam for supporting the multiple users based on the transmission mode of the sector boundary users, the weight determiner is further configured to determine the Tx beam of first transmission mode and second transmission mode users so as to increase a beamforming gain obtainable by the multiple users and to reduce inter-beam interference caused by multiple beams.

20. The Tx beamforming apparatus of claim 19, wherein the Tx beam of the first transmission mode and second transmission mode users is determined based on the following equation:

$$w_l = \xi_{max}\left(\left(\sum_{i=1,i\neq l}^{N_{ISC}} h_i^* h_i + \sum_{j=N_{ISC}+1, j\neq l}^{L} R_j + N_0 I_{2M}\right)^{-1} h_i^* h_l\right)$$

$$w_l = \xi_{max}\left(\left(\sum_{i=1,i\neq l}^{N_{ISC}} h_i^* h_i + \sum_{j=N_{ISC}+1, j\neq l}^{L} R_j + N_0 I_{2M}\right)^{-1} R_l\right)$$

where $N_0$ denotes a noise power spectral density, L denotes a number of users serviced at the same time, $N_{ISC}$ denotes the first transmission mode user serviced concurrently among the L-ary users, $I_{2M}$ denotes a 2Mx2M identity matrix, $\xi_{max}(A)$ denotes an eigen vector corresponding to a maximum eigen value of a matrix A, and $R_l$ denotes a Tx antenna channel correlation matrix.

* * * * *